US009731746B2

(12) United States Patent
Hodgson et al.

(10) Patent No.: US 9,731,746 B2
(45) Date of Patent: Aug. 15, 2017

(54) SKI FOR A SNOW VEHICLE

(71) Applicant: C3 POWERSPORTS 2014 LTD., St. Albert (CA)

(72) Inventors: Jamie Hodgson, St. Albert (CA); Kevin Forsyth, St. Albert (CA)

(73) Assignee: C3 Powersports 2014 Ltd., Alberta (CA)

( * ) Notice: Subject to any disclaimer, the term of this patent is extended or adjusted under 35 U.S.C. 154(b) by 0 days.

(21) Appl. No.: 14/750,832

(22) Filed: Jun. 25, 2015

(65) Prior Publication Data

US 2016/0257332 A1    Sep. 8, 2016

(30) Foreign Application Priority Data

Mar. 4, 2015  (CA) ..................................... 2883734

(51) Int. Cl.
*B62B 17/02*    (2006.01)
(52) U.S. Cl.
CPC .................................... *B62B 17/02* (2013.01)
(58) Field of Classification Search
CPC .......... A63C 5/08; B62B 17/00; B62D 55/06; B62M 2027/021; B62M 2027/022; B62M 2027/025
See application file for complete search history.

(56) References Cited

U.S. PATENT DOCUMENTS

| | | | | |
|---|---|---|---|---|
| 3,675,939 A * | 7/1972 | Vik | .......................... | B62B 17/04 180/182 |
| 3,817,544 A * | 6/1974 | Labelle | .................... | B62B 17/02 180/182 |
| 3,822,755 A | 7/1974 | Hine | | |
| 3,915,468 A | 10/1975 | Hoareau | | |
| 4,491,333 A * | 1/1985 | Warnke | ................... | B62M 27/02 280/28 |
| 5,370,198 A | 12/1994 | Karpik | | |
| 5,586,614 A | 12/1996 | Kouchi et al. | | |
| 6,431,301 B1 * | 8/2002 | Forbes | .................... | B62K 3/002 180/185 |
| D473,489 S * | 4/2003 | Mallette | .................. | B62M 27/02 D12/7 |
| 6,991,056 B2 * | 1/2006 | Roberts | .................... | B62B 17/02 180/182 |
| 7,017,695 B2 * | 3/2006 | Meunier | ................ | B62M 27/02 180/182 |
| 7,090,229 B2 * | 8/2006 | Monsrud | ................. | B62B 17/02 280/28 |
| 7,311,165 B2 * | 12/2007 | Roberts | .................... | A63C 5/03 180/182 |
| 7,475,751 B2 | 1/2009 | Pard et al. | | |
| 7,487,975 B2 | 2/2009 | Pryputniewicz | | |

(Continued)

*Primary Examiner* — Kevin Hurley
(74) *Attorney, Agent, or Firm* — Christensen O'Connor Johnson Kindness PLLC

(57) ABSTRACT

A ski for a snow vehicle has a ski body having an upper surface and a lower surface. The lower surface has a lift surface and a central runner. The central runner extends along a length of the ski body. The central runner depends from the ski body below the lift surfaces. There is a spindle with a first end and a second end. A ski attachment attaches the first end of the spindle to the ski body. The ski attachment has a pivot point that is positioned below a portion of the lift surface and in line with the central runner.

14 Claims, 3 Drawing Sheets

(56) References Cited

U.S. PATENT DOCUMENTS

| | | | |
|---|---|---|---|
| 8,910,738 B2 | 12/2014 | Mangum | |
| 2004/0195024 A1 | 10/2004 | Takahiko et al. | |
| 2005/0173873 A1* | 8/2005 | Ruzewski | B62M 27/02 280/28 |
| 2006/0175777 A1* | 8/2006 | Lemieux | B62B 17/02 280/28 |
| 2009/0322045 A1* | 12/2009 | Lemieux | B62B 17/04 280/28 |
| 2010/0140007 A1* | 6/2010 | Ogura | B62M 27/02 180/182 |
| 2012/0222908 A1 | 9/2012 | Mangum | |

* cited by examiner

Section 2-2

SKI FOR A SNOW VEHICLE

TECHNICAL FIELD

This relates to a ski for a vehicle designed to travel on snow.

BACKGROUND

Snow vehicles, particularly sport vehicles, generally have a driver, such as a track, and one or more skis used to steer the vehicle. As the vehicle often encounters obstacles, the ski is designed to be articulating to overcome the obstacles. In addition, the ski is generally designed to have a large surface area to support the vehicle on the snow, and one or more blades or runners to provide some control over the direction of the vehicle, particularly when the ski is controlled by the steering mechanism.

SUMMARY

In one aspect, there is provided a ski for a snow vehicle, comprising a ski body having an upper surface and a lower surface. The lower surface comprises a lift surface and a central runner, the central runner extending along a length of the ski body and downward from the lift surface relative to the upper surface. There is a spindle having a first end and a second end. A ski attachment attaches the first end of the spindle to the ski body at an attachment point along the ski body. The ski attachment comprises a pivot point that is positioned in line with the central runner and below at least a portion of the lift surface relative to the upper surface at the attachment point.

According to another aspect, the central runner comprises a hollow cavity accessible from the upper surface of the ski body, the pivot point being positioned within the hollow cavity.

According to another aspect, the ski body further comprises one or more side runners that extend parallel to the central runner.

According to another aspect, the lift surfaces are concave relative to the first runner along a width of the lift surface.

According to another aspect, the ski further comprises a snow vehicle attachment that connects the second end of the spindle to the snow vehicle. The snow vehicle attachment may comprise a forks attachment and an axle attachment that attaches to a forks and axle of a motorcycle converted to a snow vehicle.

In one aspect, there is provided a ski for a snow vehicle, comprising a ski body having a first runner and first and second lift surfaces that extend laterally from the first runner, the first runner extending below the first and second lift surfaces and extending along a length of the ski body. There is a spindle having a first end and a second end. A ski body attachment connects the first end of the spindle to the ski body. The ski body attachment has a pivot point that is positioned in line with the first runner and below at least a portion of the lift surfaces, the spindle extending above the ski body when attached. A snow vehicle attachment connects the second end of the spindle to the snow vehicle.

According to an aspect, the first runner comprises a hollow cavity accessible from an upper surface of the ski body, the pivot being positioned within the hollow cavity.

According to an aspect, the ski body further comprises one or more second runners carried by and extending below at least one of the first and second lift surfaces, the one or more second runners being parallel to the first runner.

According to an aspect, the lift surfaces are concave relative to the first runner along a width of the lift surface, and the pivot point is positioned below an apex of the lift surface.

According to an aspect, the snow vehicle attachment comprises a forks attachment and an axle attachment that attaches to a forks and axle of a motorcycle converted to a snow vehicle.

The features described above may be combined in any reasonable manner unless the features are mutually exclusive.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
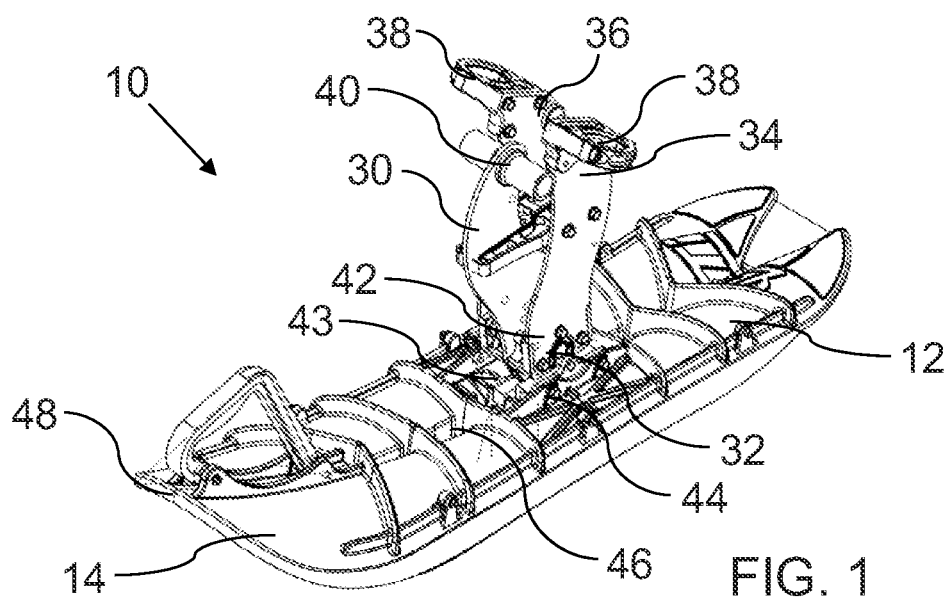
FIG. 1 is a perspective view of a ski.

A ski for a snow vehicle generally identified by reference numeral 10 will now be described with reference to FIGS. 1 through 4.

Figure 4:
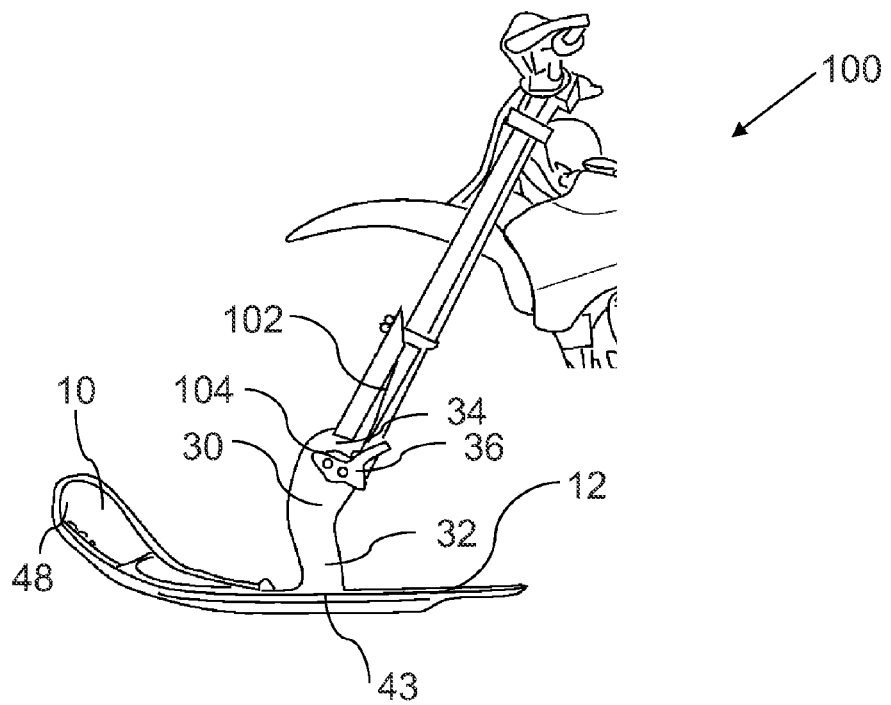
FIG. 4 is a side elevation view of the ski attached to a snow vehicle.

Referring to FIG. 4, ski 10 is designed to be attached to a snow vehicle 100. The ski 10 as described and shown is particularly designed to be used on a ski vehicle 100 that is made from converting a motorcycle, such that it attaches to the forks 102 and axle 104 of motorcycle 100. It has been found that the performance characteristics of ski 10 are particularly suited for this type of vehicle. However, it will be understood that the design features described may be adapted to other types of snow vehicles and that benefits may also be achieved for these other snow vehicles. For example, ski 10 may be used with a traditional snowmobile or other powered vehicle that uses skis. The term "snow vehicle" may also include non-powered vehicles that use skis, such as sleds, toys, snow scooters, etc.

Figure 2:
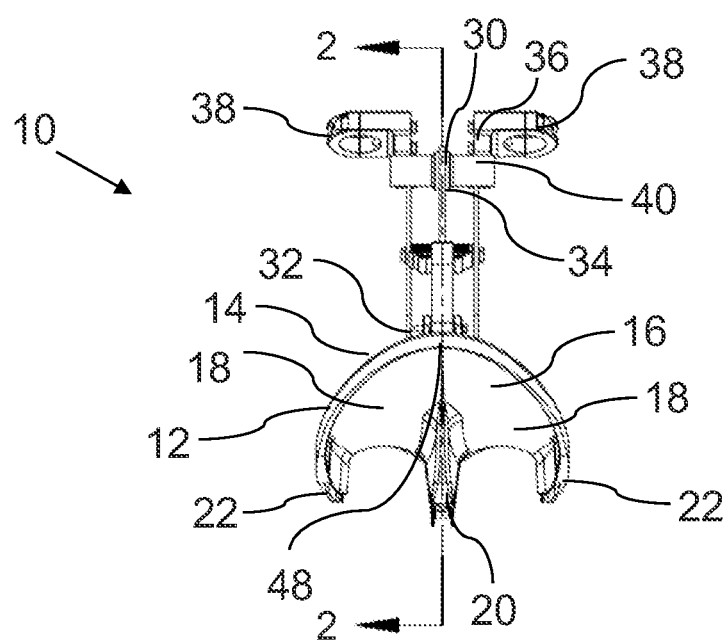
FIG. 2 is a front plan view of the ski of FIG. 1.

Referring to FIG. 2, ski 10 has a ski body 12 with an upper surface 14 and a lower surface 16. Lower surface 16 has a lift surface 18 and a central runner 20. As shown, lift surface 18 is divided into two sections by central runner 20. Preferably, lift surface 18 has a slightly concave shape relative to the ground on each side of central runner 20 and, referring to FIG. 3, a slightly convex shape along the length of ski body 12. Central runner 20 extends along the length of ski body 12 and depends from ski body 12 such that it extends downward below lift surface 18. As is known in the art, lift surface 18 is used generally to provide vertical support to ski body 12, while runner 20 is used to provide lateral control used to keep the snow vehicle stable and to steer the snow vehicle when ski body 12 is turned. Preferably, central runner 20 extends along the entire length of ski body 12 to increase the available surface area to engage with the snow. In addition to central runner 20, there are preferably side runners 22 that extend generally parallel to the direction of central runner 20 to increase lateral stability and control of ski 10. As shown, central runner 20 and side runners 22 are formed as part of ski body 12 and are formed by shaping ski body 12, such that runners 20 and 22 extend downward, and engage the snow during operation at a lower point than lift surface 18. It will be understood that other designs for skis may also be used, such as runners that are manufactured separately and attached adjacent to lift surfaces 18, or additional parts that are attached to runners 20 and 22, such as to increase the size or to reinforce runners 20 and 22.

The size, shape and other design characteristics, such as the structural reinforcement, etc., of ski body 12 may be designed based on the preferences of the user and based on well-known principles. Furthermore, it will be understood that, while the depicted design with three runners 20 and 22 is preferred for a variety of reasons, there may be other designs used. For example, central runner 20 may not be positioned at the middle of ski body 12, but may be offset with appropriate design changes, or may include more than one runner 10. In the depicted embodiment, there is a general distinction between lift surfaces 18 and runners 20 and 22. It will be understood that the overall design of ski 10 may be modified based on the intended use, including vehicle characteristics, riding styles, and riding conditions from what is shown. As these design principles are well known, they will not be described further.

Referring to FIG. 4, a spindle 30 with a first end 32 and a second end 34 is used to attach ski body 12 to snow vehicle 100. Referring to FIGS. 1 and 4, there is a snow vehicle attachment 36 at second end 34 of spindle 30 that attaches spindle 30 to snow vehicle 100. As snow vehicle 100 is a motorcycle that has been converted, snow vehicle attachment 36 includes a forks attachment 38 and an axle attachment 40 to attach to forks 102 and axle 104. While spindle 30 as depicted is particularly designed for a motorcycle conversion kit, it will be understood that it may take various configurations depending on the type of snow vehicle 100 that it is being mounted to. In particular, spindle 30 may be considered to be any component that mounts ski body 12 to snow vehicle 100 or a steering mechanism or other vehicle control device that attaches ski body 12 to snow vehicle 100. Similarly, snow vehicle attachment 36 may also be modified to fit the type of snow vehicle 100.

Figure 3:
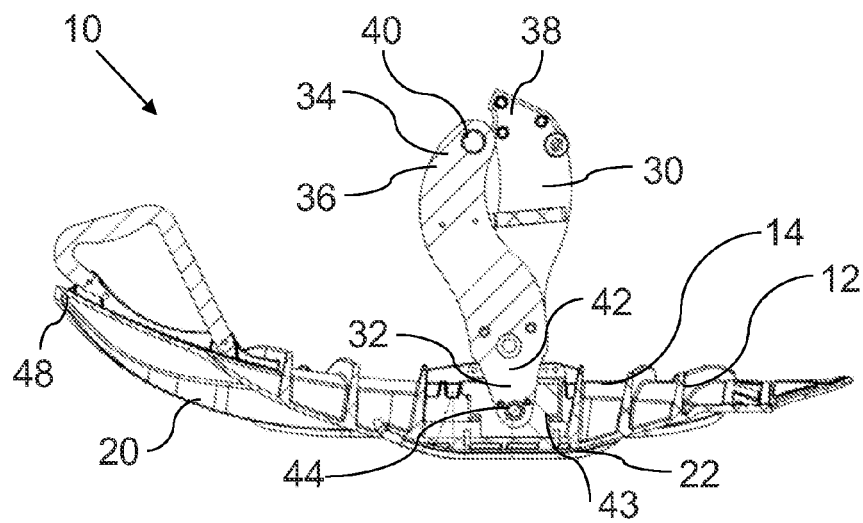
FIG. 3 is a side elevation view in section of the ski of FIG. 1.

Referring to FIG. 3, there is a ski attachment 42 that attaches first end 32 of spindle 30 to ski body 12 at an attachment point 43. As shown, ski attachment 42 has a pivot point 44 that in line with central runner 20 and is positioned below lift surface 18, or at least a portion of lift surface 18. Ideally, pivot point 44 will be as low as is practical, such as about half way down the entire height of ski body 12, including runner 20 and lift surface 18. As a minimum, when lift surface 18 is curved, pivot point 44 will be positioned between the apexes of lift surface 18. In the embodiment depicted in FIGS. 1 and 2, ski body 12 has been shaped to form central runner 20 such that an inner cavity 46 is formed on its top side and such that pivot point 44 may be positioned within cavity 46 and attached to ski body 12 therein. As can be seen in FIGS. 1 and 3, pivot point 44 is preferably not "below" lift surface 18 in the sense that it is exposed to the surface on which ski body 12 travels. While this may be possible, it would disrupt the lines of central runner 22, and risk unnecessary damage or fouling of pivot point 44. Instead, the position of pivot point 44 is merely lower than the surface that rides on the snow. Pivot point 44 is oriented such that it permits ski body 12 to rotate about an axis that is perpendicular to the length of ski body 12 and in the plane in which ski body 12 generally travels. While there may be other structural components that help support ski body 12 on spindle 30, pivot point 44 is designed such that ski body 12 is able to pivot relative to spindle 30 in order to allow the tip 48 of ski body 12 to move vertically during use. By positioning pivot point 44 below lift surface 18, or at least below upper surface 14, ski body 12 is more responsive to changing contours in the landscape. As will be understood, as the tip 48 of ski body 12 encounters an obstacle, the force applied to the tip by the obstacle will result in a greater moment arm about pivot point 44 when it is positioned below lift surface 18 than when it is positioned above lift surface 18, which results in ski body 12 responding to the obstacle more quickly.

Figure 5:
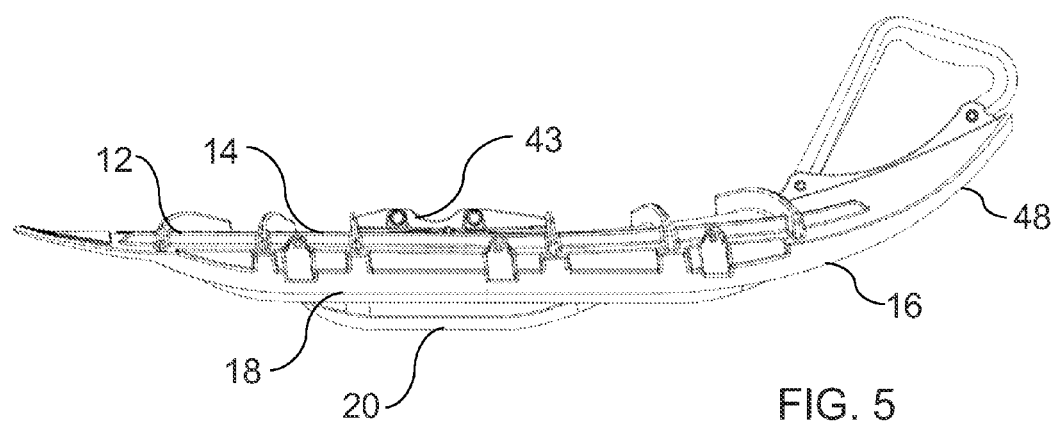
FIG. 5 is a right side view of the ski of FIG. 1.
Figure 6:
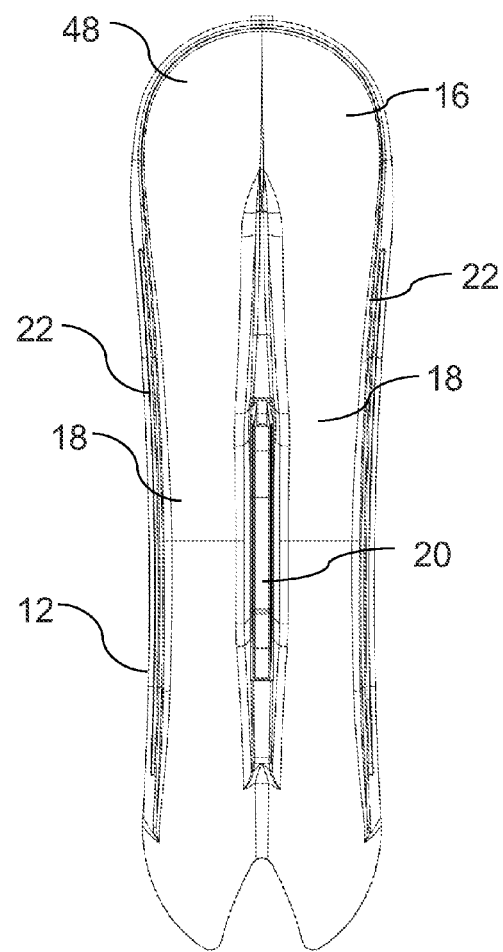
FIG. 6 is a bottom view of the ski of FIG. 1.

Referring to FIGS. 5 and 6, tip 48 preferably has a particular shape that assists with lifting ski 12 on top of the snow. As can be seen, tip 48 has a width that is greatest before or at the point at which runners 22 start. Ski 12 then tapers to a narrower width after runners 22 begin. As shown, ski 12 reaches its narrowest point around the middle of central runner 20, which generally corresponds to the position of attachment point 43. In addition, the bottom surface 16 at tip 48 has a concave, spoon-shaped surface. It is believed that this shape of tip 48 provides additional lift to ski 12 relative to other ski profiles based on the following mechanism. The shape of tip 48 allows a certain volume of snow to be collected as ski moves forward. As ski 12 continues to move forward, runners 22 maintain the amount of snow below ski 12. The decreasing width of ski 12, combined with the amount of snow being maintained between runners 20 is believed to apply an upward force to bottom surface 16 of ski 12 relative to other ski designs that assist ski 12 in riding on the top of the snow surface.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A ski assembly for a snow vehicle, comprising:
    a ski body having an upper surface and a lower surface, the lower surface comprising a lift surface and a central runner, the central runner extending along a length of the ski body and downward from the lift surface relative to the upper surface;
    a spindle having a first end and a second end that attaches to the snow vehicle; and
    a ski attachment that attaches the first end of the spindle to the ski body at an attachment point along the ski body, the ski attachment comprising a pivot point that is positioned in line with the central runner and below at least a portion of the lift surface relative to the upper surface at the attachment point such that when the second end of the spindle is attached to the snow vehicle, the ski body is permitted to pivot about the pivot point such that the ski body changes pivotal orientation relative to the spindle and the snow vehicle, while the spindle maintains a constant pivotal orientation relative to the snow vehicle.

2. The ski assembly of claim 1, wherein the central runner comprises a hollow cavity accessible from the upper surface of the ski body, the pivot point being positioned within the hollow cavity.

3. The ski assembly of claim 1, wherein the pivot point is positioned lower than the lift surface of the ski body relative to the upper surface.

4. The ski assembly of claim 1, wherein the ski body further comprises one or more side runners that extend parallel to the central runner.

5. The ski assembly of claim 1, wherein the lift surface is concave relative to the central runner along a width of the lift surface.

6. The ski assembly of claim 1, further comprising a snow vehicle attachment that connects the second end of the spindle to the snow vehicle.

7. The ski assembly of claim 6, wherein the snow vehicle attachment comprises a forks attachment and an axle attachment that attaches to forks and an axle of a motorcycle converted to the snow vehicle.

8. The ski assembly of claim 1, wherein the ski body comprises first and second side runners on first and second side edges of the ski body, the ski body having a tip with a concave lift surface and a width, the width of the ski body between the first and second side runners tapering from the width of the tip to a narrower width toward the position of the ski attachment along the length of the ski body.

9. A ski assembly for a snow vehicle, comprising:
   a ski body having a first runner and first and second lift surfaces that extend laterally from the first runner, the first runner extending below the first and second lift surfaces and along a length of the ski body;
   a spindle having a first end and a second end, the second end being connected to the snow vehicle;
   a snow vehicle attachment that connects the second end of the spindle to the snow vehicle; and
   a ski body attachment that connects the first end of the spindle to the ski body, the ski body attachment having a pivot point that is positioned in line with the first runner and below at least a portion of the lift surfaces, the spindle extending above the ski body when attached such that when the second end of the spindle is attached to the snow vehicle, the ski body is permitted to pivot about the pivot point such that the ski body changes pivotal orientation relative to the spindle and the snow vehicle, while the spindle maintains a constant pivotal orientation relative to the snow vehicle.

10. The ski assembly of claim 9, wherein the first runner comprises a hollow cavity accessible from an upper surface of the ski body, the pivot point being positioned within the hollow cavity.

11. The ski assembly of claim 9, wherein the ski body further comprises one or more side runners carried by and extending below at least one of the first and second lift surfaces, the one or more side runners being parallel to the first runner.

12. The ski assembly of claim 9, wherein the lift surfaces are concave relative to the first runner along a width of the lift surfaces.

13. The ski assembly of claim 9, wherein the snow vehicle attachment comprises a forks attachment and an axle attachment that attaches to forks and an axle of a motorcycle converted to the snow vehicle.

14. The ski assembly of claim 9, wherein the ski body comprises first and second side runners on first and second side edges of the ski body, the ski body having a tip with a concave lift surface and a width, the ski body tapering from the width of the tip to a narrower width toward the position of the ski attachment along the length of the ski body.

* * * * *